Nov. 14, 1961     W. H. NEELY     3,008,555

COUPLING ATTACHMENT OF WIRE STRUCTURE TO FRAME RAIL

Filed March 4, 1959     2 Sheets-Sheet 1

INVENTOR.
WILLIAM H. NEELY
BY
Gustav A. Wolff
ATT.

Nov. 14, 1961 W. H. NEELY 3,008,555
COUPLING ATTACHMENT OF WIRE STRUCTURE TO FRAME RAIL
Filed March 4, 1959 2 Sheets-Sheet 2

INVENTOR.
WILLIAM H. NEELY
BY
Gustav A. Wolff.
ATT

United States Patent Office 3,008,555
Patented Nov. 14, 1961

3,008,555
COUPLING ATTACHMENT OF WIRE
STRUCTURE TO FRAME RAIL
William H. Neely, Cleveland, Ohio, assignor, by mesne assignments, to Hoover Ball & Bearing Co., Saline, Mich., a corporation of Michigan
Filed Mar. 4, 1959, Ser. No. 797,111
2 Claims. (Cl. 189—36)

This invention relates to furniture and vehicle seat constructions in which open frames support wire spring structures and has particular reference to attachment of wire springs and wire spring structures to open frames having frame rails of angular or rectangular cross section, a type of frame rails preferable to frame rails of circular or round cross section, as frame rails of angular or rectangular cross section facilitate direct attachment of springs and spring structures by welding or other suitable means, holding and clamping in any desired position, and shaping or bending to almost any configuration.

The general object of the invention is the provision of a frame rail of rectangular cross section having in one side wall near an edge thereof a slot and tongue arrangement extended parallel to the longitudinal axis of the frame rail, the slot and tongue arrangement including an elongated slot permitting inserting of the preshaped attachment portion of a wire structure therethrough for contact of the attachment portion with the inside face of another wall and a tongue portion for resting and supporting the attachment portion of such wire spring structure.

Another object of the invention is the combination of a tubular frame rail of rectangular cross section with a slot and tongue arrangement of the type referred to above, with a wire spring structure having an attaching portion extended through the slot of the slot and tongue arrangement and a tongue portion inside of the frame rail for seating and supporting the inserted attachment portion of the wire spring structure.

A further object of the invention is the combination of a tubular frame and wire spring structure as described above, wherein the attachment portion of the wire spring structure has substantial L-shaped form, has one arm extended through the slot and tongue arrangement into the frame rail and seated on the tongue of the slot and tongue arrangement, and has the other arm extended outside of the frame rail in contact with the outer face of the wall with the slot and tongue arrangement.

Still another object of the invention is the combination of a tubular frame rail of rectangular cross section including in one wall a slot and tongue arrangement of the type referred to and a wire element provided with a looped attachment portion extended through the slot of the slot and tongue arrangement and seated on its tongue.

A still further object of the invention is the combination of a tubular frame rail of rectangular cross section including in one wall a slot and tongue arrangement of the type referred to and a wire element provided with a looped attachment portion extended through the slot of the slot and tongue arrangement and seated on the tongue thereof, the frame rail having a wall adjacent the first wall indented to extend into the looped attachment portion of the wire element for rigidly securing it to the tubular frame rail.

Still another object of the invention is the combination of a tubular frame rail of rectangular cross section provided in opposed side walls near their edges with parallel, symmetrical slot and tongue arrangements having elongated slots and tongues extended from said slots into the frame rail and a wire spring structure having a substantialy straight attachment portion extended through the symmetrical slot and tongue arrangements of the frame rail and secured thereto by deformation of wall portions thereof.

With the above and other objects in view, the invention has certain other marked superiorities which clearly distinguish it from presently known structures and arrangements of this type. These improvements or characteristics embodying certain novel features of construction and design are clearly set forth in the appended claims and the preferred forms of embodiment of the invention hereinafter shown with reference to the accompanying drawings forming part of the specification.

Figures 11, 16:
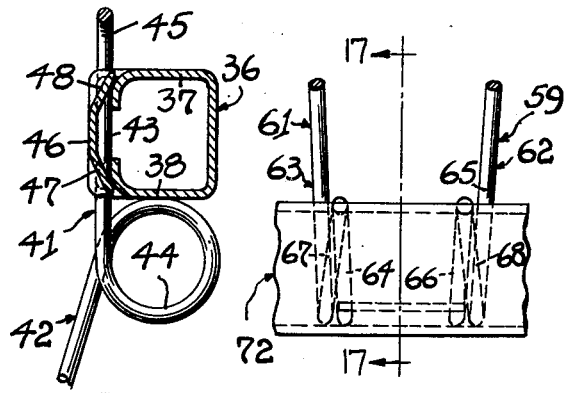
FIG. 11 is a sectional view through FIG. 9, the section being taken on line 11—11 of FIG. 9.
Figure 12:
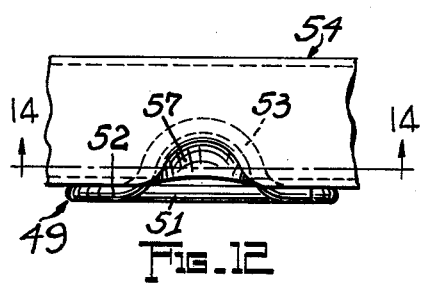
FIG. 12 is a fragmentary plan view of a tubular frame rail of rectangular cross section including in one wall a slot and tongue arrangement having extended therethrough the substantially half-circular attachment member of a wire spring, the tubular frame rail including adjacent said wall inwardly deformed wall portions to rigidly secure the wire spring to the tubular frame rail.
Figure 13:
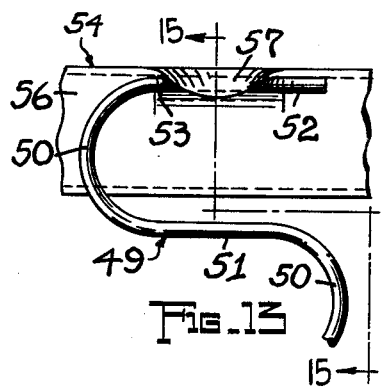
FIG. 13 is a front view of FIG. 12.
Figure 15:
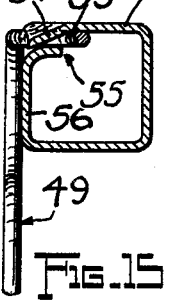
FIG. 15 is a sectional view through FIG. 13, the section being taken on line 15—15 of FIG. 13.
Figure 14:
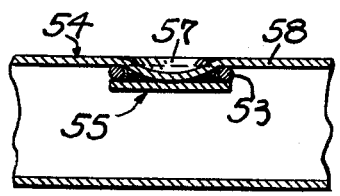
FIG. 14 is a sectional view through FIG. 12, the section being taken on line 14—14 of FIG. 12.

FIG. 16 is a fragmentary plan view of a tubular frame rail of rectangular cross section including in a wall near its bottom edge a slot and tongue arrangement having extended therethrough the half-oval shaped attachment portion of a wire spring, the tubular frame rail including opposite the half-oval shaped attachment portion inwardly extended deformations for rigidly securing the wire spring to the tubular frame rail.

Figure 17:
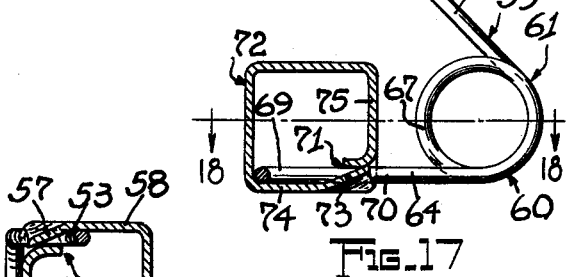

FIG. 17 is a sectional view through FIG. 16, the section being taken on line 17—17 of FIG. 16.

Figure 18:
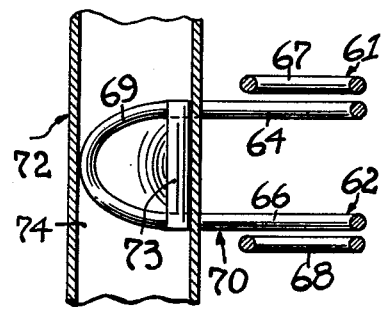

FIG. 18 is a sectional view through FIG. 17, the section being taken on line 18—18 of FIG. 17.

Referring more particularly to the frame rails shown in the drawings, reference numeral 2 designates a tubular member or frame rail of substantially rectangular cross section which is suitable for use as front, rear, or side rail of open seat frames or top, bottom, and side rail of open back frames of furniture and vehicle seat constructions.

Frame rail 2 embodies in wall 3 an elongated slot and tongue arrangement 4 formed by slitting wall 3 on a U-shaped line 5, web portion 6 of which is approximately aligned with inner face 7 of wall 8 of the frame rail. This slitting of wall 3 forms a tongue member 9 bent into frame rail 2 to provide an elongated slot 10 and an elongated support 11 extended from one edge of slot 10 into the frame rail at a right angle to wall 3.

Figure 1:
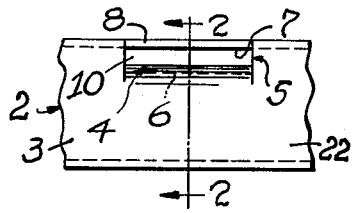
FIG. 1 is a fragmentary front view of a tubular frame rail of rectangular cross section including a slot and tongue arrangement according to the invention.
Figure 2:
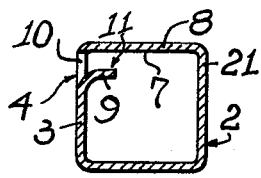
FIG. 2 is a transversal sectional view through FIG. 1, the section being taken on line 2—2 of FIG. 1.
Figure 3:
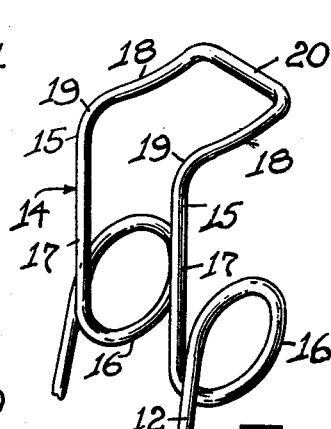
FIG. 3 is a fragmentary perspective view of a wire element with a looped attachment portion adapted to secure the wire element to the tubular frame rail shown in FIG. 1.
Figure 4:
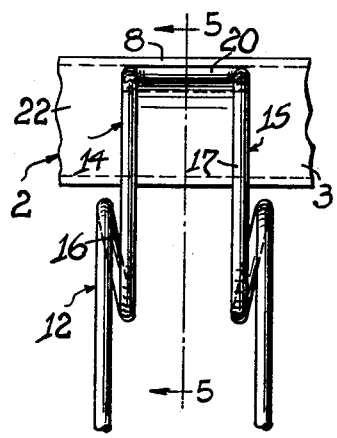
FIG. 4 is a front view of the tubular frame rail shown in FIG. 1, with the wire element of FIG. 3 attached thereto.
Figure 5:
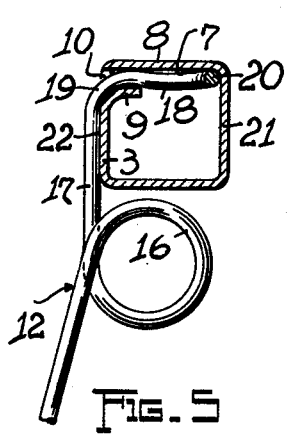
FIG. 5 is a transversal sectional view through FIG. 4, the section being taken on line 5—5 of FIG. 4.
Figure 8:
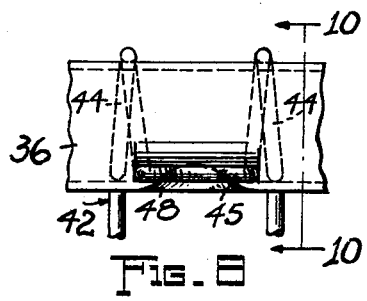
FIG. 8 is a fragmentary plan view of a tubular frame rail of rectangular cross section including in opposed walls symmetrical slot and tongue arrangements having extended therethrough a wire element with a modified form of looped attachment portion, wall portions of the tubular frame rail being deformed to rigidly secure the wire element to the frame rail.

Frame rail 2 supports a wire spring structure 12 (see FIG. 3) which includes an attachment portion 14 of yoke-shaped configuration with angular arms 15 extended from spring coils 16 of the wire spring structure. Arms 15 include lower arm portions 17 and upper arm portions 18 which are rearwardly extended from arm portions 17 by bends 19 and extend at substantially right angles to the lower arm portions 17. Bends 19 are curved to fit the curvature of the inwardly extended elongated portions of the slot and tongue arrangement 4 to properly seat arms 15 when the attachment portion 14 is secured to frame rail 2 in a manner later to be described. The upper arm portions 18, slightly curved for forcible yielding contact with wall 8 of the frame rail, are connected by cross member 20 and dimensioned and shaped to effect its contact with walls 8 and 21 when the lower arm portions 17 are in contact with outer face 22 of wall 3 of frame rail 2.

Attaching of wire spring structure 12 to tubular frame rail 2 is effected by forcing the upper portion of attachment portion 14 through elongated slot 10 into the frame rail for contact of bends 19 and upper arm portions 18 with elongated tongue member 9, upper arm portions 18 with inner face 7 of wall 8, cross member 20 with walls 8 and 21 and lower arm portions 17 with outer face 22 of wall 3. A downward pull on wire spring structure 12 is counteracted by the load resistance of elongated tongue member 9 on wall 3, and bending of the attachment portion 14 by downward pull on wire spring structure 12 is counteracted by upper arm portions 18 and cross member 20 engaged with inner face 7 of wall 8. Excessive downward pull on wire spring structure 12 is counteracted by yielding action of spring coils 16 which, in a shock-absorbing manner, resist any downward pull.

Figure 6:
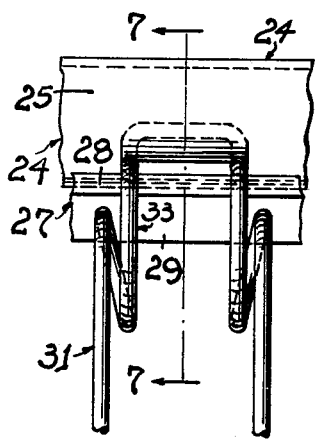
FIG. 6 is a front view of a tubular frame rail of rectangular cross section including a differently arranged slot and tongue arrangement with specific supporting, seating and spacing means, the tubular frame supporting a wire element having a modified form of attachment portion.
Figure 7:
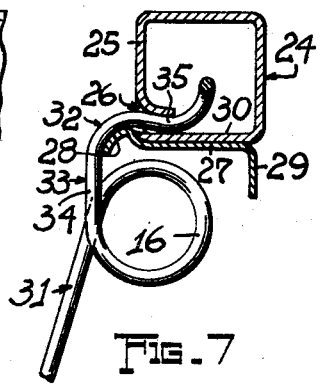
FIG. 7 is a transversal sectional view through FIG. 6, the section being taken on line 7—7 of FIG. 6.
Figure 9:
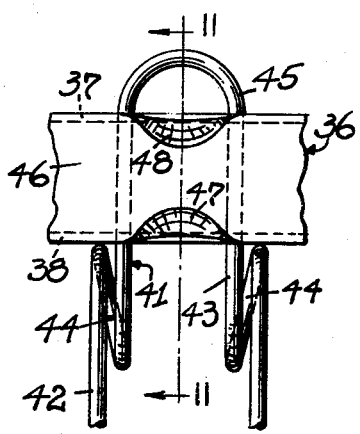
FIG. 9 is a front view of FIG. 8.
Figure 10:
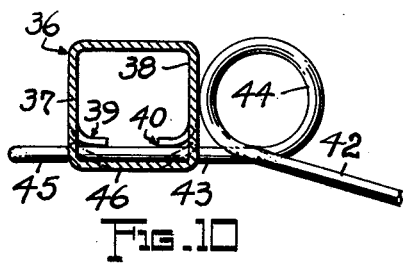
FIG. 10 is a sectional view through FIG. 8, the section being taken on line 10—10 of FIG. 8.

FIGURES 6 and 7 show a somewhat modified form of attachment means adapted to secure a wire spring construction to a tubular frame rail of substantially rectangular cross section. In this case, frame rail 24 has the lower portion of its wall 25 slitted and bent to provide a slot and tongue arrangement 26 similar to slot and tongue arrangement 4 previously described.

Slot and tongue arrangement 26 cooperates with an elongated metal strip 27 provided at its front edge with an upwardly curved bead 28 and at its rear edge with a downwardly extended flange 29, the metal strip 27 being rigidly secured to lower wall 30 of frame rail 24 to extend curved bead 28 forwardly thereof. Frame rail 24 mounts a wire spring structure 31 having an attachment means 32 of yoke-shaped configuration which includes angular arms 33 extended from spring coils 16 of wire spring structure 31. Arms 33 embody lower straight arm portions 34 and upper S-shaped arm portions 35 rearwardly extended from lower arm portions 34 at substantially right angles with respect thereto, the upper S-shaped arm portions being curved to engage and seat attachment means 32 on the curved bead 28 of metal strip 27 when such attachment means are extended into frame rail 24 through its slot and tongue arrangement 26. The disclosed modified form of attaching wire spring structure 31 to tubular frame rail 24 permits forward shifting of such wire spring structure 31 with respect to tubular frame rail 24.

FIGURES 8 through 11 show another modified form of attaching a wire spring structure to a tubular frame rail. In this case, frame rail 36 has its two opposed walls 37, 38 slotted and bent to provide two opposed, symmetrically arranged slot and tongue arrangements 39 and 40 similar to slot and tongue arrangement 4 previously Frame rail 36 has extended through slot and tongue arrangements 39 and 40 yoke-shaped attachment portion 41 of a wire spring structure 42, which attachment portion includes arms 43 integrally extended from spring coils 44 of wire spring structure 42. The top or end portion 45 of yoke-shaped attachment portion 41 has half-circular shape and is fully extended through slot and tongue arrangement 39 when spring coils 44 contact wall 38 of frame rail 36. Yoke-shaped attachment portion 41 is securely held in position by deformation of wall 46 which is indented to form near the right angle edge between adjacent perpendicular walls somewhat triangular indentations 47, 48 extended between arms 43 of the yoke-shaped attachment portion 41. When thus held in frame rail 36, the yoke-shaped attachment means is prevented from axial shifting by the curvature of its top portion 45 and contact of spring coils 44 with wall 38 of the frame rail.

FIGURES 12 through 15 show another modified form of attachment of a wire spring structure to a tubular frame rail of the type previouslyl described. In this case, the wire spring structure includes a sinuously corrugated wire spring member 49 having alternately oppositely extended loops 50 successively connected by cross members 51. Wire spring member 49 has an end cross member 52 which includes an agularly offset open loop 53 between its opposite ends. This open loop 53 is inserted into frame rail 54 through slot and tongue arrangement 55 in wall 56 of the frame rail and rigidly held in position by a somewhat triangular indentation 57 made in wall 58 near its right angle edge with adjacent wall 56, the indentation being extended into open loop 53 of end cross member 52.

FIGURES 16 through 18 show still another form of attachment of a wire spring structure to a tubular frame rail of the type previously described. In this case, wire spring structure 59 embodies V-shaped yielding lever portion 60 with a pair of symmetrically arranged V-shaped arms 61, 62 each including two angularly related levers 63, 64 and 65, 66 respectively. Arms 61, 62 include spring coils 67, 68 and are connected to each other by a curved member 69 to form a yoke-shaped portion 70 which is extended through slot and tongue arrangement 71 into frame rail 72 similar to frame rail 2 previously described. Yoke-shaped portion 70 is rigidly secured to frame rail 72 by a curved indentation 73 in wall 74 adjacent wall 75, the curved indentation being extended into the space encircled by curved member 69.

While there have been shown several particular embodiments of the invention, it will be obvious to those skilled in the art that various changes and modifications may be made therein without departing from the invention, therefore, it is intended in the appended claims to cover all such changes and modifications as fall within the true spirit and scope of the invention.

What I claim as new and desire to secure by Letters Patent of the United States is:

1. In a coupling connection of a frame and a wire structure supported thereon, a tubular frame rail having a pair of angularly related side walls which intersect to form a corner on said rail, a tongue struck inwardly from one of said side walls so as to form a slot in said one side wall adjacent said corner, said tongue extending inwardly of said rail in a spaced relation with said other side wall, said wire structure having a loop portion formed therein which projects into said rail through said slot so that one side of said loop portion is adjacent the inner side of said other side wall, said loop portion having an open end located at said slot and having spaced arm portions which extend inwardly of said rail from said open end and are connected by an integral cross member which engages the inner side of said other side wall, said wire structure being bent at the open end of said loop portion so that the opposite side of said loop portion is engaged with said tongue adjacent said slot and the wire structure extends away from said slot along the outer surface of said one side wall.

2. In a coupling connection of a frame and a wire structure supported thereon, a tubular frame rail having a pair of angularly related side walls which intersect to form a corner on said rail, a tongue struck inwardly from one of said side walls so as to form a slot in said one side wall adjacent said corner, said tongue being bent inwardly of said rail at one edge of said slot and extending inwardly of said rail in a spaced substantially parallel relation with said other side wall, said wire structure having a loop portion formed therein which projects into said rail through said slot so that one side of said loop portion is adjacent the inner side of said other side wall, said loop portion having an open end located at said slot and having spaced arm portions which extend inwardly of said rail from said open end, said arm portions being curved intermediate their ends in a direction away from said other side wall and being connected at the end of said loop portion opposite said one end by a cross member which engages the inner side of said other side wall, said wire structure being bent at the open end of said loop portion so that the opposite side of said loop portion is bent into conformity with said bent tongue adjacent said slot and the wire structure extends away from said slot along the outer surface of said one side wall.

References Cited in the file of this patent

UNITED STATES PATENTS

| | | |
|---|---|---|
| 2,357,248 | Young | Aug. 29, 1944 |
| 2,371,407 | Neely | Mar. 13, 1945 |
| 2,440,001 | Blumensaadt | Apr. 20, 1948 |
| 2,581,761 | Haas | Jan. 8, 1952 |
| 2,695,658 | Flint | Nov. 30, 1954 |
| 2,706,519 | Kranz | Apr. 19, 1955 |
| 2,825,394 | Hamilton | Mar. 4, 1958 |

FOREIGN PATENTS

| | | |
|---|---|---|
| 543,440 | Italy | May 21, 1956 |
| 161,719 | Sweden | Dec. 17, 1957 |